(12) United States Patent
Yin

(10) Patent No.: US 11,244,622 B2
(45) Date of Patent: Feb. 8, 2022

(54) DYNAMIC POWER CONTROL FOR OLED DISPLAYS

(71) Applicant: Parade Technologies, Ltd., San Jose, CA (US)

(72) Inventor: You-Ben Yin, Hsinchu (TW)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 16/893,199

(22) Filed: Jun. 4, 2020

(65) Prior Publication Data

US 2021/0383758 A1 Dec. 9, 2021

(51) Int. Cl.
*G09G 3/3258* (2016.01)
*G09G 3/3233* (2016.01)
*G06F 3/041* (2006.01)
*G06F 3/044* (2006.01)

(52) U.S. Cl.
CPC ......... *G09G 3/3258* (2013.01); *G09G 3/3233* (2013.01); *G06F 3/044* (2013.01); *G06F 3/0412* (2013.01); *G09G 2320/0276* (2013.01); *G09G 2320/0646* (2013.01); *G09G 2330/021* (2013.01)

(58) Field of Classification Search
None
See application file for complete search history.

(56) References Cited

U.S. PATENT DOCUMENTS

| 10,004,124 | B1* | 6/2018 | Ko | H01L 27/3244 |
| 10,672,341 | B2* | 6/2020 | Lee | H01L 27/3244 |
| 2004/0201555 | A1* | 10/2004 | Ozawa | G09G 3/3258 345/76 |
| 2006/0197734 | A1* | 9/2006 | Morita | G09G 3/3688 345/100 |
| 2006/0267881 | A1* | 11/2006 | Jeon | G09G 3/22 345/75.2 |
| 2009/0278771 | A1* | 11/2009 | Yamamoto | G09G 3/3233 345/76 |

(Continued)

FOREIGN PATENT DOCUMENTS

JP 2007248723 A * 9/2007

OTHER PUBLICATIONS

Machine translation of JP2007248723 downloaded from Google patents (Year: 2007).*

*Primary Examiner* — Dorothy Harris
(74) *Attorney, Agent, or Firm* — Morgan, Lewis & Bockius LLP

(57) ABSTRACT

This application is directed to controlling display power consumption of a display panel by dynamically adjusting the voltage level of the display power supply. The display panel includes a plurality of display pixels, each driven by the display power supply. Video data corresponds to an image frame to be displayed on the display panel and includes a plurality of multibit data items. Each display pixel is associated with a respective multibit data item defining a magnitude of a drive current of the respective display pixel. A first multibit data item is identified in the video data for a first display pixel to be driven to provide a corner luminance level on the image frame. A corner drive voltage is determined among a plurality of drive voltages of the display pixels based on the first multibit data item and applied to adjust the voltage level of the display power supply.

20 Claims, 8 Drawing Sheets

(56) References Cited

U.S. PATENT DOCUMENTS

| | | | | |
|---|---|---|---|---|
| 2010/0156944 A1* | 6/2010 | Haupt | ............... | G09G 3/3688 |
| | | | | 345/690 |
| 2013/0033527 A1* | 2/2013 | Yen | ............... | G09G 3/3696 |
| | | | | 345/690 |
| 2013/0083093 A1* | 4/2013 | Kim | ............... | G09G 3/3258 |
| | | | | 345/690 |
| 2014/0118409 A1* | 5/2014 | Jun | ............... | G09G 3/3233 |
| | | | | 345/690 |
| 2014/0354624 A1* | 12/2014 | Chaji | ............... | G09G 3/3233 |
| | | | | 345/212 |
| 2016/0358526 A1* | 12/2016 | Wang | ............... | G09G 3/20 |
| 2017/0006688 A1* | 1/2017 | Dai | ............... | G09G 3/2003 |
| 2017/0345381 A1* | 11/2017 | Hou | ............... | G09G 3/2011 |
| 2018/0204518 A1* | 7/2018 | Wang | ............... | H01L 27/3265 |
| 2018/0226009 A1* | 8/2018 | Lin | ............... | G09G 3/3275 |
| 2021/0012705 A1* | 1/2021 | Pyun | ............... | G09G 3/3291 |

* cited by examiner

DYNAMIC POWER CONTROL FOR OLED DISPLAYS

TECHNICAL FIELD

This application relates generally to a display device including, but not limited to, methods and systems of driving an organic light-emitting diode (OLED) display with a power supply that is dynamically adjusted according to digital video data fed into the OLED display to optimize power consumption of the OLED display.

BACKGROUND

Displays are widely applied in today's industrial and consumer products, such as cellular phones, GPS devices, television devices, cameras, computer screens, digital tablets, and the like. Some displays have been realized in active matrix organic light-emitting diode (AMOLED) displays. An AMOLED display includes a two-dimensional array of light-emitting diodes (LEDs) coupled to thin film transistor (TFT) devices. The TFT devices are configured to drive the LEDs with different drive currents defined by input video data. The LEDs are thereby driven to display different colors with different brightness in each image frame, enabling display of still images or video clips on the AMOLED display. The AMOLED display is oftentimes driven by a positive power supply and a negative power supply provided by power management integrated circuit (PMIC). However, in some situations, the PMIC cannot efficiently generate the negative power supply. It would be beneficial to drive a display device (e.g., the AMOLED display) with non-negative power supplies while optimizing power consumption of the display device.

SUMMARY

This application is directed to driving a display panel between a positive power supply and a ground supply and conserving power consumption of a display panel by dynamically adjusting the positive power supply. Specifically, in response to receiving video data of each image frame, a display panel identifies a display pixel corresponding to a maximum luminance level on the image frame and adjusts a display power supply to a voltage level that is sufficient to sustain operation of the display pixel corresponding to the maximum luminance level. As such, the display power supply is adjusted to or slightly above a minimum voltage level that is sufficient to sustain the operation of the display pixel for the purposes of conserving power consumption efficiently.

In one aspect of the application, a method of controlling display power consumption includes driving a display panel including a plurality of display pixels between a display power supply and a ground supply, and receiving video data corresponding to an image frame to be displayed on the display panel. The video data includes a plurality of multibit data items, and each display pixel is associated with a respective multibit data item defining a magnitude of a drive current of the respective display pixel. The method further includes dynamically adjusting the display power supply according to the video data of the image frame. Specifically, a first multibit data item is identified in the video data corresponding to a first display pixel to be driven to provide a corner luminance level (e.g., a maximum luminance level) of the image frame among the plurality of display pixels. A corner drive voltage of a plurality of drive voltages is determined based on the first multibit data item. The plurality of drive voltages corresponds to the plurality of display pixels and is configured to enable the drive current of each display pixel in the display panel. As such, a voltage level of the display power supply is adjusted according to the corner drive voltage.

In some embodiments, for each display pixel, a respective one of the plurality of drive voltages is applied on a respective drive transistor to generate the drive current to drive the respective display pixel. Further, in some embodiments, for each display pixel, the respective drive transistor includes a P-type metal-oxide-semiconductor field-effect transistor (MOSFET) that is physically disposed within the respective display pixel and electrically coupled to at least a row interconnect and a column interconnect that are used as a control line and a data line.

Further, in some embodiments, for each drive transistor, the respective one of the plurality of drive voltages is applied by generating a gate voltage with reference to a respective gamma reference voltage for driving a gate of the respective drive transistor. Specifically, for each display pixel, the gate voltage is generated within a range of the ground supply and the respective gamma reference voltage based on the multibit data item corresponding to the respective display pixel. A source of the respective drive transistor may be electrically coupled to the display power supply directly or indirectly. The respective one of the plurality of drive voltages corresponds to a voltage drop between the gate voltage and the display power supply. In some embodiments, the respective gamma reference voltage is defined in a range between two predefined gamma rail voltages according to a gamma multibit signal, and each of the two predefined gamma rail voltages is linearly correlated with the display power supply. In some embodiments, the respective gamma reference voltage is linearly correlated with the display power supply. In some embodiments, the respective gamma reference voltage is greater than the display power supply, and the drive current outputted by the respective drive transistor is substantially small (i.e., below a threshold drive current, such as 1.0 nA) when the gate voltage is equal to the respective gamma reference voltage.

In some embodiments, the plurality of display pixels includes a first subset of display pixels, a second subset of display pixels, and a third subset of display pixels. The first, second, and third subsets correspond to three distinct colors (e.g., red, green, and blue). For display pixels in each of the first, second, and third subsets, the gate voltages driving the gates of the corresponding drive transistors are generated with reference to a respective one of three distinct gamma reference voltages.

In some embodiments, the corner drive voltage is applied to drive the first display pixel. The voltage level of the display power supply is adjusted based on the corner drive voltage by setting a corner gate voltage of a first drive transistor coupled in the first display pixel according to the corner drive voltage and determining the voltage level of the display power supply according to the corner gate voltage of the first drive transistor. The first display pixel is therefore driven to provide the corner luminance level when the corner gate voltage and the display power supply are applied on the first drive transistor. Further, in some embodiments, the corner gate voltage of the first drive transistor is associated with the corresponding first multibit data item. In some embodiments, the corner gate voltage of the first drive transistor is set to a predetermined corner level, independently of the first multibit data item associated with the first display pixel. Additionally, in some embodiments, the predetermined corner level is greater than a voltage level of the ground supply.

In some embodiments, the display panel includes an array of active-matrix organic light-emitting diode (AMOLEDs), and each display pixel includes an organic light-emitting diode (LED) configured to be driven by the respective drive current to provide a luminance level determined by the respective multibit data item of the respective display pixel.

In some embodiments, the plurality of display pixels is coupled to a pixel drive circuit that is disposed adjacent to the plurality of display pixels and electrically coupled to a plurality of interconnects routed to access the plurality of display pixels. Further, in some embodiments, the pixel drive circuit is driven with a circuit power supply that is fixed, independently of dynamically adjusting the display power supply. Alternatively, in some embodiments, the pixel drive circuit is driven with a circuit power supply that is dynamically adjusted with reference to the display power supply.

In another aspect of this application, a display device includes a display panel having a plurality of display pixels, a pixel drive circuit coupled to the display panel, and including a plurality of digital-to-analog converters (DACs), one or more processors, and memory. The memory stores instructions, which, when executed by the one or more processors, cause the processors to perform any of the above methods.

In another aspect of this application, a non-transitory computer-readable medium has instructions stored thereon, which when executed by one or more processors cause the processors to perform any of the above methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

In various embodiments of this application, an electronic device or system having its own display includes a display panel, and the display panel includes an array of display pixels driven by a pixel drive circuit optionally disposed in a peripheral region adjacent to the array of display pixels. The array of display pixels is powered by a display power supply and a ground supply, and the pixel drive circuit is powered by a circuit power supply and the ground supply. Optionally, the circuit power supply is electrically coupled to, generated from, or independent from the display power supply. To conserve power consumption of the display panel, the display power supply is dynamically adjusted based on video data of each image frame to be displayed by the display panel. For example, the display power supply is varied to or slightly above a minimum voltage level sufficient to display the respective image frame. In some situations, the circuit power supply is adjusted with the display power supply, automatically or in a controlled manner. Alternatively, in some situations, the circuit power supply is kept at a fixed voltage level and is not adjusted with the display power supply.

While being powered by the display power supply, each display pixel in the display panel is driven by a drive voltage converted from a multibit data item of the video data with reference to a gamma reference voltage. The gamma reference voltage is applied during the course of encoding and decoding luminance values in the display panel to achieve gamma correction (i.e., for correcting a nonlinear correlation between the luminance values and the drive voltages of the display pixels). In some embodiments, the gamma reference voltage is linearly correlated with the display power supply, and automatically follows the adjustment of the display power supply. As such, adjustment of the display power supply results in a variation of the gamma reference voltage without compromising display operation and performance of the display panel (e.g., while continuing to display each image frame of the video data reliably).

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, modules and networks have not been described in detail so as not to unnecessarily obscure aspects of the embodiments.

Figure 1:
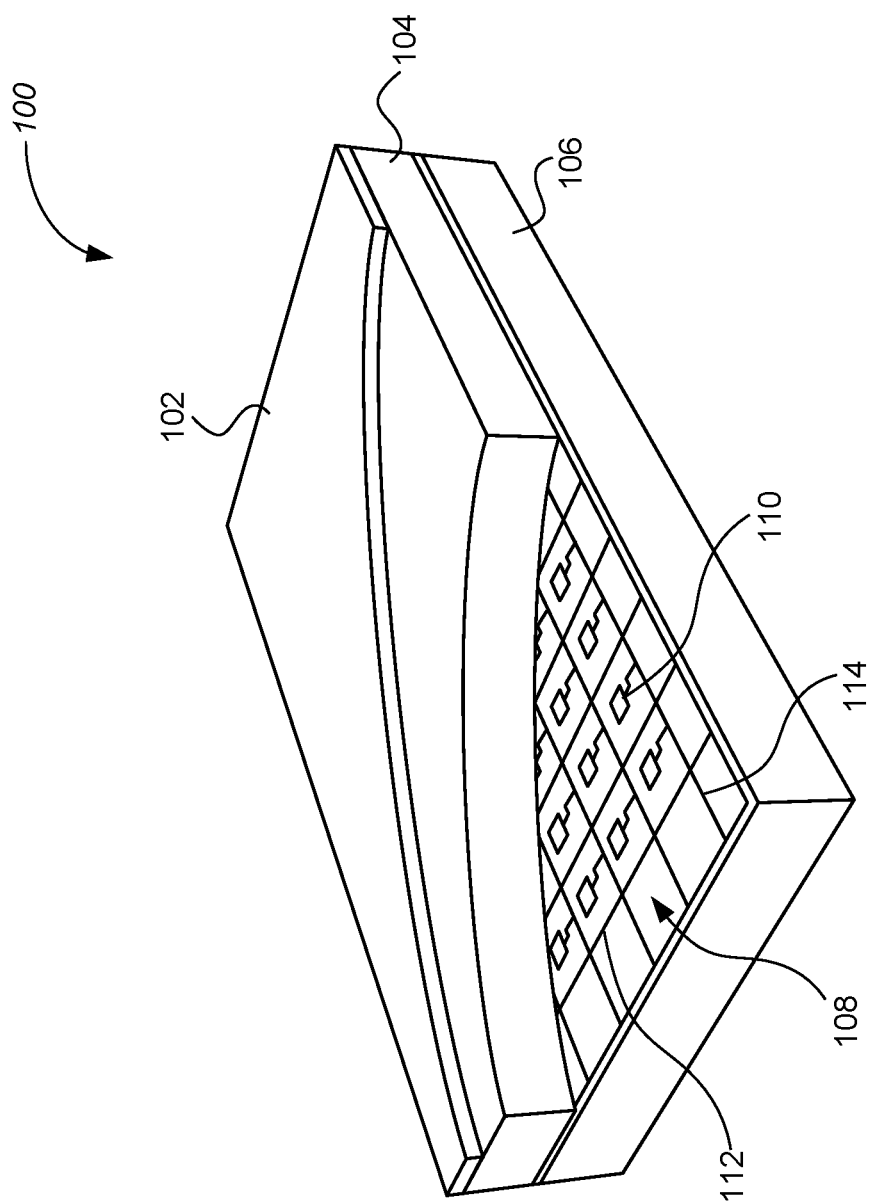
FIG. 1 is an example active matrix organic light emitting diode device, in accordance with some embodiments of the application.

FIG. 1 is an example active matrix organic light emitting diode (AMOLED) device 100, in accordance with some embodiments of the application. AMOLED device 100 is formed based on an organic light emitting diode (OLED) layer 104, and further includes a top encapsulation layer 102 and a backplane substrate 106. The AMOLED device 100 includes a two-dimensional (2D) array of display pixels, and each display pixel includes a light emitting diode (LED) that is formed on the OLED layer 104 and controlled to emit light individually. Specifically, in each display pixel, the LED includes respective organic compounds on the OLED layer 104, and is configured to emit light when one or more TFT drive units generate current that flows through the organic compounds corresponding to the respective LED. The 2D Display pixel array has been used to create digital displays for electronic devices, including but not limited to televisions, computer monitors, tablet computers, mobile phones, and game consoles. Each AMOLED device 100 represents and is sometimes called a display panel device.

The top encapsulation layer 102 is configured to conceal and protect the OLED layer 104, and the AMOLED device 100 emits light from its top surface (i.e., via the top encapsulation layer 102). The top encapsulation layer 102 is made of transparent material. When the AMOLED device 100 emits light from its bottom surface (i.e., via the backplane substrate 106), the top encapsulation layer 102 is optionally made of transparent or non-transparent material. The top encapsulation layer 102 includes a bottom surface that directly contacts the OLED layer 104. In some embodiments, the bottom surface of the top encapsulation layer 102 is coated with a layer of electrically conductive material that acts as a cathode (also called a common electrode) for the array of display pixels formed on the OLED layer 104. The cathode is made of material having a substantially low work function. In some embodiments of this application, the cathode of the AMOLED device 100 (i.e., the layer of electrically conductive material coating the bottom surface of the top encapsulation layer 102) is electrically coupled to a ground supply.

A TFT array 108 is formed on the backplane substrate 106, and directly contacts the OLED layer 104. The TFT array 108 includes a two dimensional array of TFT drive units 110, row interconnects 112 and column interconnects 114. Each TFT drive unit 110 is connected to one of the row interconnects 112 and one of the column interconnects 114. Each TFT drive unit 110 of the TFT array 108 is electrically coupled to one or more LEDs associated with a corresponding display pixel, and configured to generate an electrical current to drive the one or more LEDs of the corresponding display pixel. Specifically, in some embodiments, each TFT drive unit 110 includes at least two TFTs: a first TFT to control charging of a storage capacitor, and a second TFT to couple the corresponding LEDs to a voltage source at a level needed to create a substantially constant current within the corresponding LEDs. This substantially constant current is controlled at each display pixel to enable the respective display pixel to emit colored light at a corresponding luminance level.

In some embodiments, the TFT array 108 is formed on the backplane substrate 106. More specifically, a gate layer, a semiconductor layer, a source/drain layer, one or more conductive layers, and one or more intervening insulating layers are deposited on the backplane substrate 106. These material layers are lithographically patterned on the backplane substrate 106 to form functional parts (e.g., gate, source and drain) of TFTs of the TFT drive units 110 as well as the row and column interconnects 112 and 114 for accessing the TFT drive units 110 in the TFT array 108.

Figure 2:
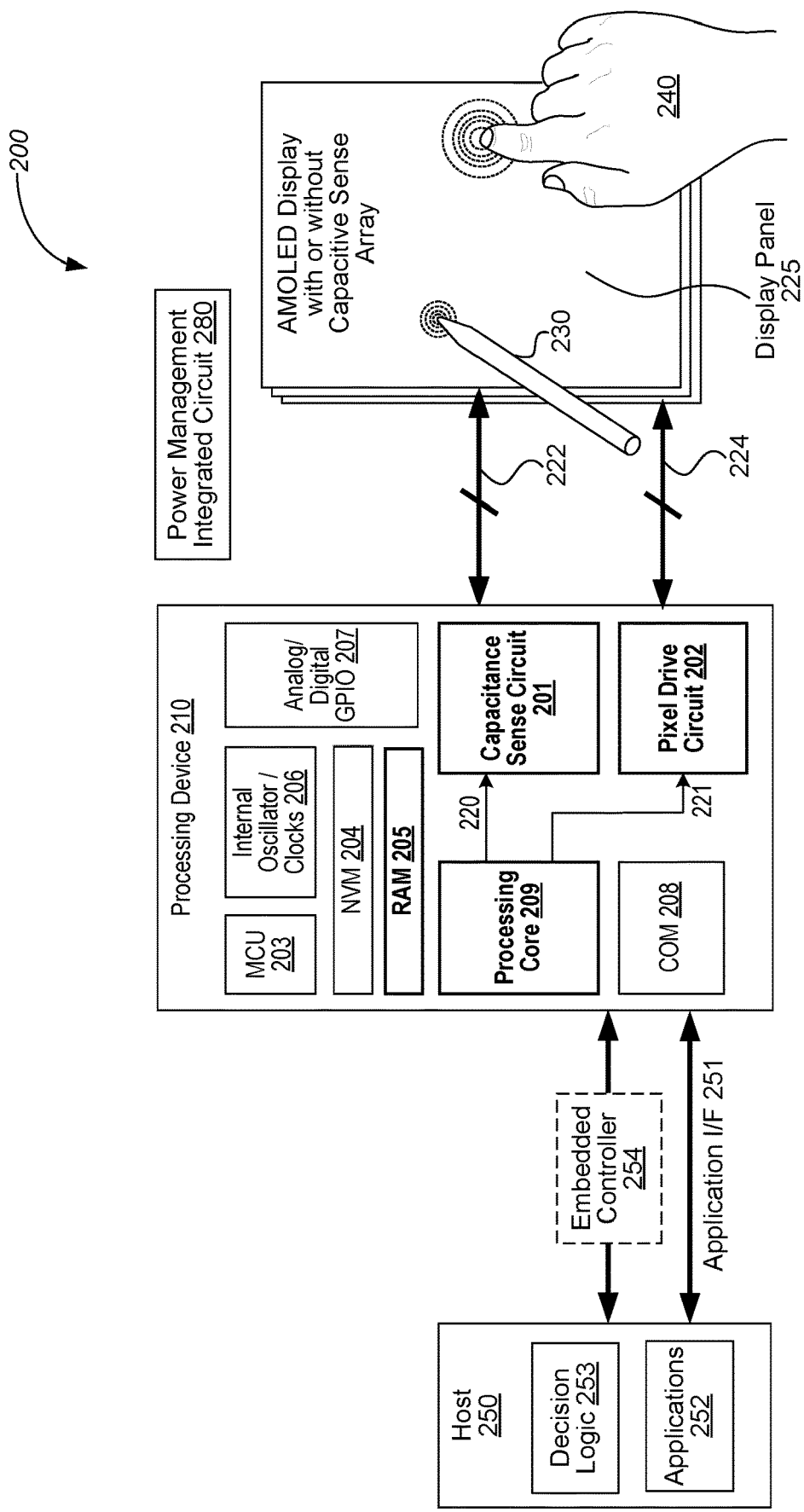
FIG. 2 is a block diagram of an example electronic system having a processing device that processes image signals and/or capacitive sense signals, in accordance with some embodiments.

FIG. 2 is a block diagram of an example electronic system 200 having a processing device 210 that processes image signals and/or capacitive sense signals, in accordance with some embodiments. The processing device 210 is electrically coupled to a display panel 225 including a display pixel array. The display pixel array further includes a plurality of display pixels, a plurality of control lines, and a plurality of data lines. Each display pixel is powered between a display power supply and a ground supply. The processing device 210 operates in a display driving mode in which a drive voltage is generated to drive a data line of each display pixel to enable display of a corresponding color on the respective display pixel with a respective luminance level. In some embodiments, the processing device 210 includes a processing core 209 that provides display information (e.g., video data of a sequence of image frames) to a pixel drive circuit 202, such that the pixel drive circuit 202 can drive individual display pixels in the display panel 225 to display images or video clips based on the display information. In some embodiments, the processing core 209 includes some or all functions of the pixel drive circuit 202 (i.e., part or all of the pixel drive circuit 202 is integrated in the processing core 209). Further, in the depicted embodiment, the display pixel array of the display panel 225 is coupled to the processing device 210 via a bus 224, and configured to receive display driving signals (e.g., the drive voltages) from the processing device 210 via the bus 224. More specifically, the display driving signals are generated by the pixel drive circuit 202 of the processing device 210 and provided to the display pixel array 225 via the bus 224.

In some embodiments, the display panel 225 further includes a capacitive sense array, and the processing device 210 can also operate in a touch sensing mode in addition to the display driving mode. Optionally, the capacitive sense array is formed on the same layer of electrically conductive material that coats the bottom surface of the top encapsulation layer 102 and provides electrodes for the display pixel array. Optionally, the capacitive sense array is formed on an alternative layer of conductive material that is distinct from the layer of electrically conductive material providing the common electrodes for the display pixel array. The processing device 210 is configured to measure capacitance variations at the capacitive sense array and detect one or more touches proximate to a surface of the display panel 225. In some embodiments, the processing device 210 alternates between the display driving mode and the touch sensing mode according to a predetermined duty cycle (e.g., 80% in the display driving mode) for the display driving mode, and detects a contact with or a proximity to a touch sensing surface associated with the display pixel array without interfering with display operations of the display pixel array. Conversely, in some embodiments, the processing device 210 operates in the display driving mode and in the touch sensing mode independently of each other via the display pixel array and capacitive sense array, respectively.

In the touch sensing mode, capacitive sense elements of the capacitive sense array are used to allow a capacitance sense circuit 201 of the processing device to measure self-capacitance, mutual capacitance, or any combination thereof. In the depicted embodiment, the capacitive sense array is coupled to the processing device 210 via a bus 222, and configured to provide capacitive sense signals to a capacitance sense circuit 201 of the processing device 210 via the bus 222. By these means, the processing device 210 detects the presence of a touch object 240, the presence of a stylus 230, or any combination thereof on the capacitive sense array. In an example, the touch object is an active stylus 230. The active stylus 230 operates as the timing "master," and the processing device 210 adjusts the timing of the capacitive sense array to match that of the active stylus 230.

In some embodiments, the processing device 210 includes analog and/or digital general purpose input/output ("GPIO") ports 207. The GPIO ports 207 may be programmable. The GPIO ports 207 may be coupled to a Programmable Interconnect and Logic ("PIL"), which acts as an interconnect between the GPIO ports 207 and a digital block array of the processing device 210 (not shown). In some embodiments, the digital block array is configured to implement a variety of digital logic circuits (e.g., DACs, digital filters, or digital control systems) using configurable user modules ("UMs"). The digital block array may be coupled to a system bus. The processing device 210 may also include memory, such as random access memory ("RAM") 205 and non-volatile memory ("NVM") 204. The RAM 205 may be static RAM ("SRAM"). The non-volatile memory 204 may be flash memory, which may be used to store firmware (e.g., control algorithms executable by the processing core 209 to implement operations described herein). The processing device 210 may also include a memory controller unit ("MCU") 203 coupled to the memory and to the processing core 209. The processing core 209 is a processing element configured to execute instructions or perform operations. The processing device 210 may include other processing elements as would be appreciated by one of ordinary skill in the art having the benefit of this disclosure. It should also be noted that the memory may be internal to the processing device 210 or external to it. In the case of the memory being internal, the memory may be coupled to a processing element, such as the processing core 209. In the case of the memory being external to the processing device 210, the processing device 210 is coupled to the other device in which the memory resides as would be appreciated by one of ordinary skill in the art having the benefit of this disclosure. Some or all of the operations of the processing core 209 may be implemented in firmware, hardware, software, or some combination thereof.

In some embodiments, the processing core 209 generates a touch detection enable signal 220 and a display driving enable signal 221 that are synchronized to control the capacitance sensing circuit 201 and the pixel drive circuit 202 to detect touch locations and drive individual display pixels, respectively. The touch detection enable signal 220 is used to enable the touch sensing mode. In the touch sensing mode, the capacitive sense array is decoupled from the pixel drive circuit 202 and reconfigured to be coupled to the capacitance sense circuit 201. Self or mutual capacitance of sense elements of the capacitive sense array is optionally scanned by the capacitance sense circuit 201. One or more touch locations are thereby detected if one or more objects touch the touch sensing surface of the electronic system 200. Alternatively, in some embodiments, the display driving enable signal 221 is used to enable the display driving mode (e.g., to decouple the capacitance sense circuit 201 from the capacitive sense array and to couple the pixel drive circuit 202 to the capacitive sense array). In such a display driving mode, the pixel drive circuit 202 provides a drive voltage to each display pixel of the display pixel array corresponding to an intended color. The display pixel displays the intended color with a certain luminance level upon receiving the drive voltage. Optionally, the touch detection enable signal 220 and the display driving enable signal 221 are enabled sequentially and share operation time of the display panel 225. Optionally, the touch detection enable signal 220 and the display driving enable signal 221 are enabled independently of each other (e.g., during two separate durations of time).

The processing device 210 may also include an analog block array (not shown) (e.g., a field-programmable analog array). The analog block array is also coupled to the system bus. An analog block array may be configured to implement a variety of analog circuits (e.g., ADCs or analog filters) using, in some embodiments, configurable universal machines. The analog block array may also be coupled to the GPIO 207.

The processing device 210 may include internal oscillator/clocks 206 and a communication block ("COM") 208. In some embodiments, the processing device 210 includes a spread-spectrum clock (not shown). The oscillator/clocks 206 provides clock signals to one or more of the components of processing device 210. The communication block 208 may be used to communicate with an external component, such as an application processor 250, via an application interface ("I/F") line 251. In some embodiments, the processing device 210 may also be coupled to an embedded controller 254 to communicate with the external components, such as a host 250. In some embodiments, the processing device 210 is configured to communicate with the embedded controller 254 or the host 250 to send and/or receive data.

The processing device 210 may reside on a common carrier substrate such as, for example, an integrated circuit ("IC") die substrate, a multi-chip module substrate, or the like. In some embodiments, the components of the processing device 210 may be one or more separate integrated circuits and/or discrete components. In some embodiments, the processing device 210 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the embodiments described herein are not limited to having a configuration of a processing device coupled to an application processor, but may include a system that measures the capacitance on the capacitive sense array and sends the raw data to a host computer 250 where it is analyzed by an application. In effect, the processing that is done by the processing device 210 may also be done in the application processor. Specifically, in some embodiments, instead of performing the operations of the processing core 209 in the processing device 210, the processing device 210 may send the raw data or partially-processed data to the host 250. The host 250, as illustrated in FIG. 2, may include decision logic 253 that performs some or all of the operations of the processing core 209. Operations of the decision logic 253 may be implemented in firmware, hardware, software, or a combination thereof. The host 250 may include a high-level Application Programming Interface (API) in applications 252 that perform routines on the received data, such as compensating for sensitivity differences, other compensation algorithms, baseline update routines, start-up and/or initialization routines, interpolation operations, or scaling operations. The operations described with respect to the processing core 209 may be implemented in the decision logic 253, the applications 252, or in other hardware, software, and/or firmware external to the processing device 210. In some other embodiments, the processing device 210 is the host 250.

Each of the pixel drive circuit 202 and the capacitance sense circuit 201 may be integrated into the IC of the processing device 210, or in a separate IC. In some embodiments, descriptions of the pixel drive circuit 202 or capacitance sense circuit 201 may be generated and compiled for incorporation into other integrated circuits. For example, behavioral level code describing the pixel drive circuit 202 or capacitance sense circuit 201, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the pixel drive circuit 202 or capacitance sense circuit 201.

In some embodiments, the electronic system 200 further includes a power management integrated circuit (PMIC) 280 configured to provide one or more power supplies for driving the display panel 225 and the processing device 21. The PMIC 280 includes one or more DC-to-DC converters configured to generate one or more local voltage supplies from one or more system voltage supplies. In an example, the PMIC 280 provides at least two related positive voltage supplies to drive the display panel 225 and the pixel drive circuit 202, respectively.

It is noted that the components of the electronic system 200 may include all of the components described above. In some embodiments, the electronic system 200 includes fewer than all of the components described above. In some embodiments, the electronic system 200 is used in a tablet computer. In some embodiments, the electronic device is used in other applications, such as a desktop computer, a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook embodiments.

Figure 3A:
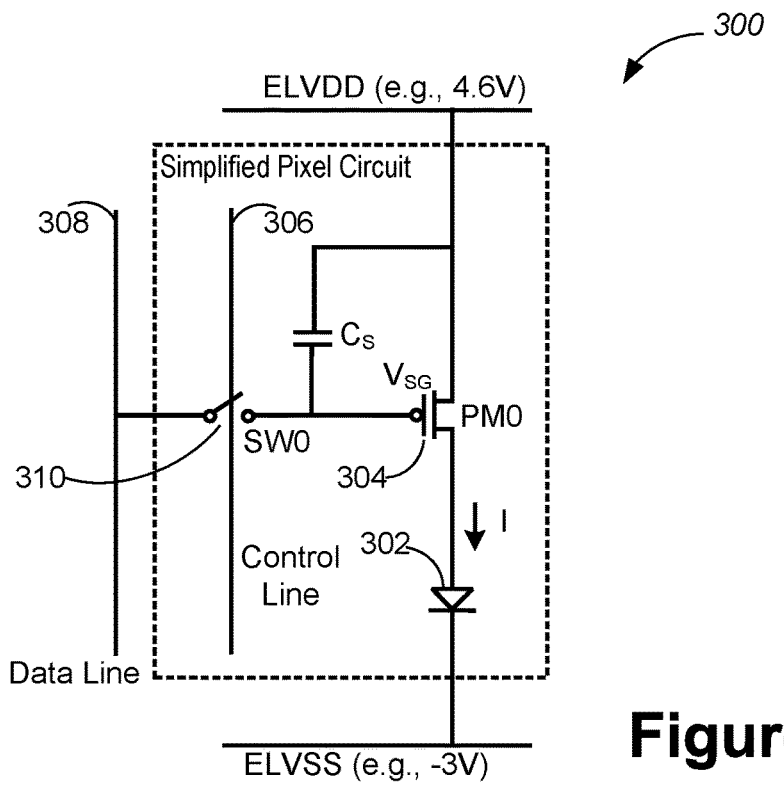
FIGS. 3A and 3B are circuit diagrams of two example display pixels, each of which is applied to form a display pixel array of a display panel, in accordance with some embodiments.
Figure 3B:
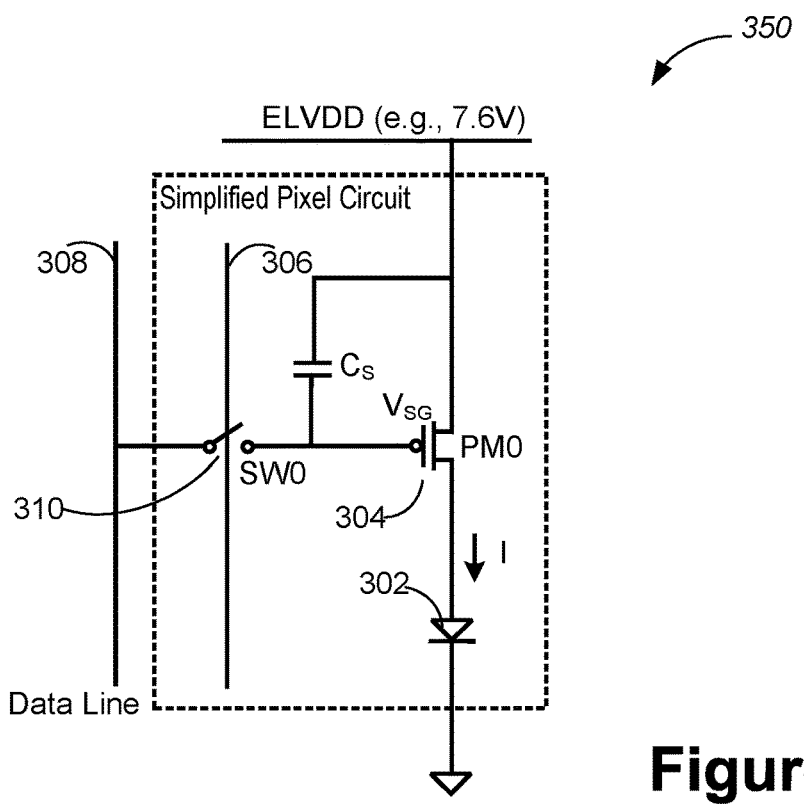

FIGS. 3A and 3B are circuit diagrams of two example display pixels 300 and 350, each of which is applied to form a display pixel array of a display panel 225, in accordance with some embodiments. The display panel 225 includes a two-dimensional display pixel array made of the display pixels 300 or 350, and each display pixel 300 or 350 includes an LED 302 and a drive transistor 304 coupled to the LED 302. Each display pixel 300 or 350 is accessed via a control line 306 and a data line 308. The control line 306 controls a switch SW0 (310) coupled to the display pixel, allowing a drive voltage provided by the data line 308 to be applied onto a gate of the drive transistor 304 when the switch 310 is enabled by a control signal applied to the control line 306. Both of the control and data lines 306 and 308 are electrically coupled to a pixel drive circuit 202 that is disposed external to an active area of the display panel 225 containing the display pixel array.

Referring to FIG. 3A, the display pixel 300 is powered between a positive power supply ELVDD and a negative power supply ELVSS. The voltage level of the positive power supply ELVDD is above the ground voltage level of a ground supply GND, and the voltage level of the negative power supply ELVSS is below the ground voltage level. For example, the voltage levels of the power supplies ELVDD and ELVSS can be 4.6V and −3V, respectively. The display panel 225 is coupled to a PMIC 280 to receive the power supplies ELVDD and ELVSS. In some embodiments, the PMIC 280 includes one or more DC-to-DC converters (e.g., a buck-boost converter configured to generate the negative power supply ELVSS). In some embodiments, the PMIC 280 further includes a boost converter configured to generate the negative power supply ELVDD.

Referring to FIG. 3B, the display pixel 350 is driven between the display power supply ELVDD and the ground supply GND. The voltage level of the display power supply ELVDD is above the ground voltage level of the ground supply GND (e.g., equal to 7.6V). The display panel 225 is coupled to the PMIC 280 to receive the display power supply ELVDD. In some embodiments, the PMIC 280 includes one or more DC-to-DC converters (e.g., a boost converter configured to generate the positive power supply ELVDD). The display pixels 350 of the display panel 225 do not use the negative power supply ELVSS that is below the ground voltage level. Therefore, the PMIC 280 does not include any buck-boost converter configured to provide the negative power supply ELVSS.

Figure 4A:
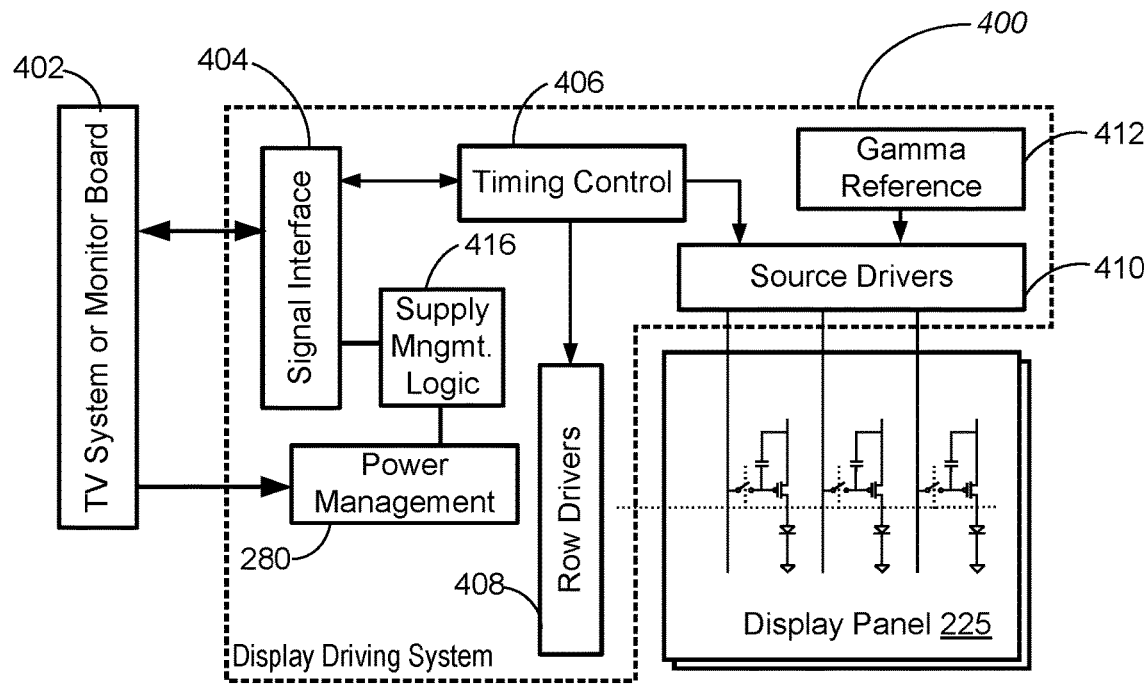
FIG. 4A is a block diagram illustrating an example display driving system of the electronic system shown in FIG. 2, in accordance with some embodiments.

FIG. 4A is a block diagram illustrating an example display driving system 400 of the electronic system 200 shown in FIG. 2, in accordance with some embodiments. The display driving system 400 is coupled between a television system or monitor board 402 and a display panel 225, and is optionally a combination of a PMIC 280, a pixel drive circuit 202, and part of a processing core 209. The display driving system 400 is configured to provide power to the display panel 225 and drive the display panel 225 according to video data received from the TV system or monitor board 402. In various embodiments of this application, the display driving system 400 drives the display panel 225 between a display power supply ELVDD and a ground supply GND. The display power supply ELVDD is dynamically adjusted according to the video data received from the TV system or monitor board 402 for display on the display panel 225.

The display driving system 400 receives from the TV system or monitor board 402 a stream of video data corresponding to a sequence of image frames in a video clip. Each image frame includes a plurality of multibit data items, and each display pixel 350 is associated with a respective multibit data item defining the magnitude of the drive current of the respective display pixel 350 in the display panel 225. In an example, three adjacent display pixels 350 correspond to green, red, and blue, and each of the three adjacent display pixels 350 is driven by a respective drive current defined by a respective multibit data item and provides a respective luminance level for the respective color. More specifically, the display driving system 400 includes a signal interface 404 configured to receive the stream of video data and covert the stream of video data to the plurality of multibit data items in each image frame. In some embodiments, the signal interface 404 is a synchronous serial data communication interface, and includes at least a clock port and a serial data port for receiving a clock signal and the stream of video data that are synchronized with each other. Optionally, the video data is converted by the signal interface 404 into the plurality of multibit data items on a frame-by-frame basis, and the plurality of multibit data items of each image frame in the video are sequentially stored in a local cache. Optionally, each image frame is divided to a plurality of image blocks, and the video data is converted by the signal interface 404 into the plurality of multibit data items on a block-by-block basis.

The display driving system 400 further includes a timing controller 406, a plurality of row drivers 408, a plurality of source drivers 410 and a gamma reference generator 412. During the course of displaying each image frame, the timing controller 406 provides the plurality of multibit data items to the row and source drivers 410, and synchronizes operations of the row and source drivers 410. In some embodiments, each image frame is displayed on the display panel by activating a plurality of rows of display pixels 350 sequentially. When a row is selected by a corresponding row driver 408, each display pixel 350 in the respective row is coupled to a respectively source driver 410 that coverts a corresponding multibit data item to a drive voltage, thereby generating a drive current to drive the respective display pixel 350. In some embodiments, each source driver 410 is shared by a number of columns. When a row is selected by a corresponding row driver 408, display pixels 350 in the number of columns are sequentially coupled to the source driver 410 shared by the number of columns. While each display pixel 350 in the number of columns is coupled to source driver 410, the source driver 410 converts a corresponding multibit data item to a drive voltage to generate a drive current to drive the respective display pixel 350.

The gamma reference generator 412 is coupled to the source drivers 410, and configured to provide gamma correction for the drive voltages generated by the source drivers 410 (i.e., compensating for a non-linear correlation between the drive voltages of the source drivers 410 and the luminance levels of the display pixels 350 of the display panel 225). In some embodiments, each source driver 410 includes a digital-to-analog converter (e.g., the DAC 420 in FIG. 4B) configured to convert each multibit data item in the video data to a respective drive voltage. The gamma reference generator 412 is configured to generate a gamma reference voltage $V_{GAMMA}$. The DAC receives the gamma reference voltage $V_{GAMMA}$, and applies it as a reference voltage setting a maximum voltage value for the drive voltage outputted by the source driver 410.

The display driving system 400 further includes supply management logic 416 configured to dynamically adjust the display power supply ELVDD that powers the display panel 225 according to the video data of each image frame. Specifically, the supply management logic 416 identifies a first multibit data item in the video data corresponding to a first display pixel 350 to be driven to provide a corner luminance level (e.g., a maximum luminance level) of the image frame among the plurality of display pixels 350, and determines a corner drive voltage of a plurality of drive voltages based on the first multibit data item. The plurality of drive voltages corresponds to the plurality of display pixels 350 and is configured to enable the drive current of each display pixel in the display panel. A voltage level of the display power supply ELVDD is adjusted according to the corner drive voltage of this image frame.

Figure 4B:
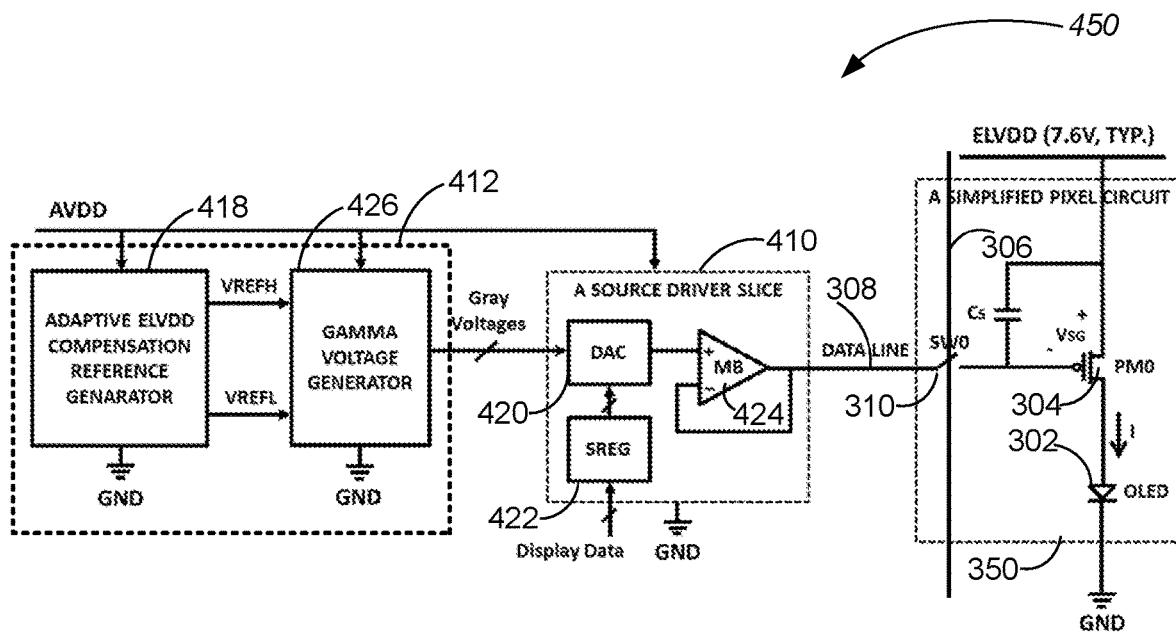
FIG. 4B is a block diagram illustrating a pixel drive circuit configured to drive a single display pixel, in accordance with some embodiments.

FIG. 4B is a block diagram illustrating a pixel drive circuit 450 configured to drive a single display pixel 350, in accordance with some embodiments. The display pixel 350 includes an LED 302 and a drive transistor 304 coupled to the LED 302. The pixel drive circuit 450 includes a gamma reference generator 412 and a source driver 410. The source driver 410 is coupled to the drive transistor 304 of the display pixel 350, and configured to drive the drive transistor 304 with a drive voltage. In some embodiments, the gamma reference generator 412 further includes an adaptive supply compensation reference generator 418 and a gamma voltage generator 426. The adaptive supply compensation reference generator 418 is coupled to the gamma voltage generator 426, and configured to provide two gamma rail voltages (e.g., a high gamma rail voltage $V_{REFH}$ and a low gamma rail voltage $V_{REFL}$) to the gamma voltage generator 412. The gamma voltage generator 412 is coupled to the source driver 410, and configured to generate a gamma reference voltage $V_{GAMMA}$ based on the high and low gamma rail voltages $V_{REFH}$ and $V_{REFL}$. As such, the gamma reference voltage $V_{GAMMA}$ is generated between the two gamma rail voltages $V_{REFH}$ and $V_{REFL}$.

The source driver 410 includes a DAC 420, a register 422, and a buffer 424. The register 422 holds display data of the display pixel 350 (i.e., a multibit data item corresponding to the display pixel 350 in the image frame). In an example, the multibit data item includes N bits (e.g., 8 or 16 bits). The multibit data item is a serial data item when received, and is held by the register 422 as a parallel data item at an input of the DAC 420. The DAC receives both the multibit data item and the gamma reference voltage $V_{GAMMA}$, and generates a drive voltage $V_{DR}$. In an example, the drive voltage $V_{DR}$ of the display pixel 350 is represented as follows:

$$V_{DR} = \frac{n}{2^N} V_{GAMMA} \qquad (1)$$

where n is a decimal magnitude of the multibit data item corresponding to the display pixel 350.

The drive voltage $V_{DR}$ is buffered and applied on a data line 308 coupled to the display pixel 350. A control line 306 is coupled to a switch 310 in this display pixel 350 and configured to enable or disable the switch 310. When the switch 310 is turned on, the drive voltage $V_{DR}$ is applied to the gate of the drive transistor 304. The drive transistor 304 generates the drive current $I_{DR}$ driving the LED 302 in response to receiving the drive voltage $V_{DR}$. Specifically, the drive voltage $V_{DR}$ corresponds to a voltage drop $V_{GS}$ from the gate to a source of the drive transistor 304. In some embodiments, the voltage drop $V_{GS}$ determines the drive current $I_{DR}$ as follows:

$$I_{DR} = k\frac{W}{L}(V_{GS} - V_{th})^2 \qquad (2)$$

where k is a transistor coefficient, W and L are width and length of the drive transistor 304, and $V_{th}$ is a threshold voltage of the drive transistor 304. As shown in equation (2), given the drive transistor 304, the magnitude of the drive current $I_{DR}$ is determined by the magnitude of the voltage drop $V_{GS}$ across the gate and source of the drive transistor 304. The luminance level of the LED 302 is correlated with the drive current $I_{DR}$, and therefore, is correlated with the voltage drop $V_{GS}$ and the drive voltage $V_{DR}$.

In this embodiment shown in FIG. 4B, the drive transistor includes a P-type MOSFET that is physically disposed within the respective display pixel 350 and electrically coupled to at least a row interconnect (e.g., the control line 306) and a column interconnect (e.g., the data line 308). The voltage drop $V_{GS}$ across the gate and source of the drive transistor 304 corresponds to a voltage difference between the display power supply ELVDD and the drive voltage $V_{DR}$ applied on the data line 308. The luminance level of the LED 302 is correlated with the drive current $I_{DR}$, which is further correlated with the voltage difference between the display power supply ELVDD and the drive voltage $V_{DR}$. According to equations (2) and (3), the luminance level of the LED 302 (Lum) is correlated with the multibit data item as follows:

$$Lum \sim I_{DR} = k\frac{W}{L}(V_{DR} - ELVDD - V_{th})^2. \qquad (3)$$

In some situations, the drive transistor 304 has a leakage current when the voltage drop between the display power supply ELVDD and the drive voltage $V_{DR}$ is less than the threshold voltage $V_{th}$, and does not turn off the drive transistor 304 completely. The drive voltage $V_{DR}$ is greater than the display power supply ELVDD for the purposes of completely turning off the drive transistor 304 (i.e., suppressing the leakage current below a leakage current threshold). The respective gamma reference voltage $V_{GAMMA}$ defines the drive voltage $V_{DR}$ for turning off the drive transistor 304. Thus, in some embodiments, the respective gamma reference voltage $V_{GAMMA}$ is greater than the display power supply ELVDD, and the drive current $I_{DR}$ outputted by the respective drive transistor 304 is substantially small (below a threshold drive current, such as 0.1 nA) when the gate voltage of the drive transistor 304 is equal to the respective gamma reference voltage $V_{GAMMA}$.

In some embodiments, the display pixel 350 is driven to provide a maximum luminance level (i.e., a corner luminance level) of the image frame among the plurality of display pixels 350. A corner voltage drop $V_{GS}$ across the gate and source of the drive transistor 304 is determined based on equation (2) as $$\sqrt{\frac{I_{DR}}{k\frac{W}{L}}} + V_{th}.$$

The display power supply ELVDD can be adjusted to a threshold supply level sufficient to provide this corner voltage drop $V_{GS}$ across the gate and source of the drive transistor 304. If the display power supply ELVDD is set to be greater than the threshold supply level, the display power supply ELVDD does not contribute to the luminance levels of the display pixels 350 in the image frame. However, it may increase power consumption of the display panel 225 and the display driving system 400.

In an example, the display pixel 350 providing the corner luminance level of the image frame corresponds to a multibit data item of 00000000. The corner drive voltage applied at the gate is 0.0 V, and the corner voltage drop $V_{GS}$ is determined according to the drive current $I_{DR}$ associated with the corner luminance level. The display power supply ELVDD is configured to provide the corner voltage drop $V_{GS}$, and a level of the display power supply ELVDD matches the magnitude of the corner voltage drop $V_{GS}$.

In another example, the display pixel 350 providing the corner luminance level of the image frame corresponds to a multibit data item greater than 00000000, such as 00000111. The corner drive voltage $V_{DR}$ applied at the gate is not equal to 0.0, but is a function of the gamma reference voltage $V_{GAMMA}$ as shown in equation (1). The corner drive voltage $V_{DR}$ is set for the drive transistor 304 coupled in the display pixel 350, and applied to determine the voltage level of the display power supply ELVDD by combining the corner drive voltage $V_{DR}$ (i.e., the gate voltage of the drive transistor 304) and the corner voltage drop $V_{GS}$. In some embodiments, according to equation (1), the corner drive voltage $V_{DR}$ applied at the gate of the drive transistor 304 is associated with the corner multibit data item. Alternatively, in some embodiments, the corner drive voltage $V_{DR}$ applied at the gate of the drive transistor 304 is set to a predetermined corner level (e.g., 1.0 V or 0.25·ELVDD), independently of the corner multibit data item associated with the display pixel 350 providing the corner luminance level of the image frame. The predetermined corner level is greater than the ground voltage level of the ground supply.

In some embodiments, the display driving system 400 (in FIG. 4A) includes a circuit power supply AVDD configured to power the gamma reference generator 412 and the source drivers 410. Optionally, the circuit power supply AVDD is fixed, independently of dynamically adjusting the display power supply ELVDD. Optionally, the circuit power supply AVDD is dynamically adjusted with reference to the display power supply ELVDD. For example, the circuit power supply AVDD tracks the display power supply ELVDD while keeping a fixed voltage (e.g., 0.5V) above the display power supply ELVDD. More details on adjustment of the power supplies ELVDD and AVDD are discussed below with reference to FIGS. 6 and 7.

Figure 5:
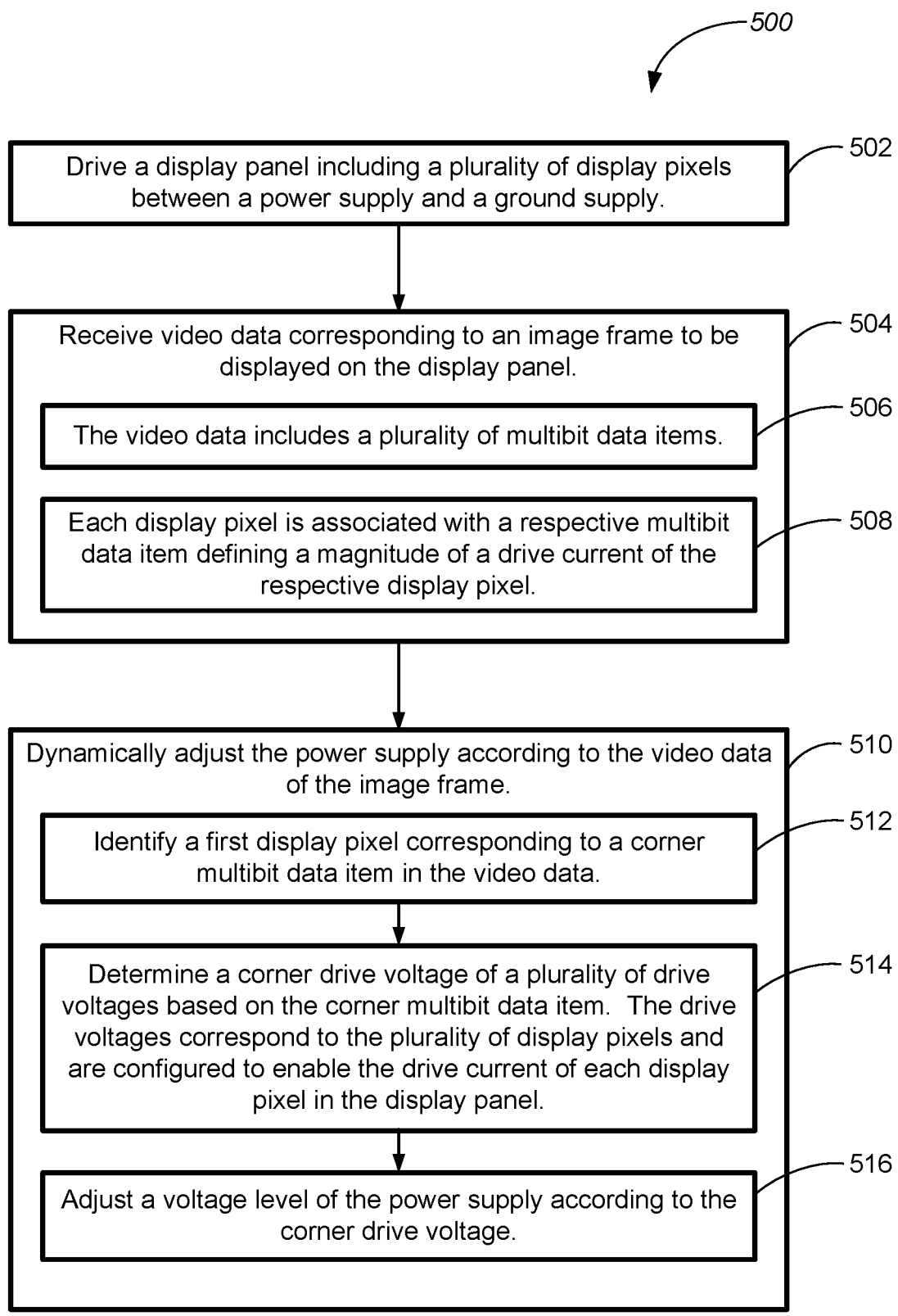
FIG. 5 is a flow diagram of an example method of controlling display power consumption for driving a display panel, in accordance with some embodiments.

FIG. 5 is a flow diagram of an example method 500 of controlling display power consumption for driving a display panel 225, in accordance with some embodiments. The method 500 is implemented by a display driving system 400 including a pixel drive circuit 202 and a PMIC 280 of an electronic system 200. The electronic system 200 includes a display panel 225 having a plurality of display pixels 350. The pixel drive circuit 202 or PMIC 280 is disposed adjacent to the display pixels 350, and electrically coupled to a plurality of interconnects (e.g., control lines 308, data lines 306, and power supply lines) routed to access the plurality of display pixels 350. In some embodiments, the display driving system 400 includes a non-transitory computer-readable medium, having instructions stored thereon. When executed by the display driving system 400 (e.g., the supply management logic 416), the instructions cause the display driving system 400 to perform the method 500 of controlling display power consumption for driving the display panel 225.

The display driving system 400 drives (502) this display panel 225 between a display power supply ELVDD and a ground supply GND. The display driving system 400 receives (504) video data corresponding to an image frame to be displayed on the display panel 225. The video data includes (506) a plurality of multibit data items, and each display pixel is associated (508) with a respective multibit data item defining a magnitude of a drive current $I_{DR}$ of the respective display pixel. In some embodiments, the display panel 225 includes an array of AMOLEDs, and each display pixel 350 includes an OLED 302 configured to be driven by the respective drive current $I_{DR}$ to provide a luminance level determined by the respective multibit data item of the respective display pixel 350.

In some embodiments, for each display pixel 350, the display driving system 400 applies a respective one of a plurality of drive voltages on a respective drive transistor 304 to generate the drive current $I_{DR}$ to drive the respective display pixel. Further, in some embodiments, for each display pixel, the respective drive transistor 304 includes a P-type MOSFET that is physically disposed within the respective display pixel 350 and electrically coupled to at least a row interconnect (e.g., a control line 308) and a column interconnect (e.g., a data line 306).

The display driving system 400 dynamically adjusts (510) the display power supply according to the video data of the image frame. Adjustment of the display power supply ELVDD includes identifying (512) a first multibit data item in the video data corresponding to a first display pixel to be driven to provide a corner luminance level (e.g., a maximum luminance level) of the image frame among the plurality of display pixels, determining (514) a corner drive voltage of a plurality of drive voltages $V_{DR}$ based on the first multibit data item, and adjusting (516) the voltage level of the display power supply ELVDD according to the corner drive voltage. The plurality of drive voltages $V_{DR}$ corresponds to the plurality of display pixels 350 and is configured to enable the drive current $I_{DR}$ of each display pixel 350 in the display panel 225. In some embodiments, the corner drive voltage is applied to drive the first display pixel. A corner gate voltage is set for a first drive transistor coupled in the first display pixel according to the corner drive voltage, and the voltage level of the display power supply ELVDD is determined according to the corner gate voltage of the first drive transistor. The first display pixel is driven to provide the corner luminance level when the corner gate voltage and the display power supply ELVDD are applied on the first drive transistor. Optionally, the corner gate voltage of the first drive transistor is associated with the corresponding first multibit data item. Optionally, the corner gate voltage of the first drive transistor is set to a predetermined corner level, independently of the first multibit data item associated with the first display pixel. The predetermined corner level is greater than a voltage level of the ground supply GND.

For each display pixel 350, the display driving system 400 applies a respective one of the plurality of drive voltages on the respective drive transistor 304. In an example, the respective one of the plurality of drive voltages $V_{DR}$ is generated with reference to a respective gamma reference voltage $V_{GAMMA}$ (e.g., using a DAC 420) and applied as a gate voltage for driving a gate of the respective drive transistor 304 in the respective display pixel 350. For each display pixel, the gate voltage is generated within a range of the ground supply and the respective gamma reference voltage based on the multibit data item corresponding to the respective display pixel. A source of the respective drive transistor 304 is electrically coupled to the display power supply ELVDD directly or indirectly. A voltage drop is formed between the gate voltage (i.e., the respective one of the plurality of drive voltages $V_{DR}$) and the display power supply ELVDD and determines the respective drive current generated by the respective drive transistor 304.

Further, in some embodiments, the respective gamma reference voltage $V_{GAMMA}$ used to generate the drive voltage $V_{DR}$ is defined in a range between two predefined gamma rail voltages $V_{REFH}$ and $V_{REFL}$ according to a gamma multibit signal, and each of the two predefined gamma rail voltages $V_{REFH}$ and $V_{REFL}$ is linearly correlated with the display power supply ELVDD. In some embodiments, the respective gamma reference voltage $V_{GAMMA}$ is linearly correlated with the display power supply ELVDD. In some embodiments the respective gamma reference voltage $V_{GAMMA}$ is greater than the display power supply ELVDD, and the drive current outputted by the respective drive transistor is substantially small (below a threshold drive current, such as 0.1 nA) when the gate voltage is equal to the respective gamma reference voltage $V_{GAMMA}$. More details on generation of the gamma reference voltage $V_{GAMMA}$ defined by the gamma multibit signal are discussed below with reference to FIG. 8.

In some embodiments, the plurality of display pixels includes a first subset of display pixels, a second subset of display pixels, and a third subset of display pixels. The first, second, and third subsets correspond to three distinct colors. For display pixels in each of the first, second, and third subsets, the gate voltages driving the gates of the corresponding drive transistors 304 are generated with reference to a respective one of three distinct gamma reference voltages $V_{GAMMA}$. In an example, a first gamma reference voltage $V_{GAMMA1}$ is used by a first subset of red pixels, and a second gamma reference voltage $V_{GAMMA2}$ is used by a second subset of blue pixels. The first and second gamma reference voltages are distinct from each other.

Figure 6:
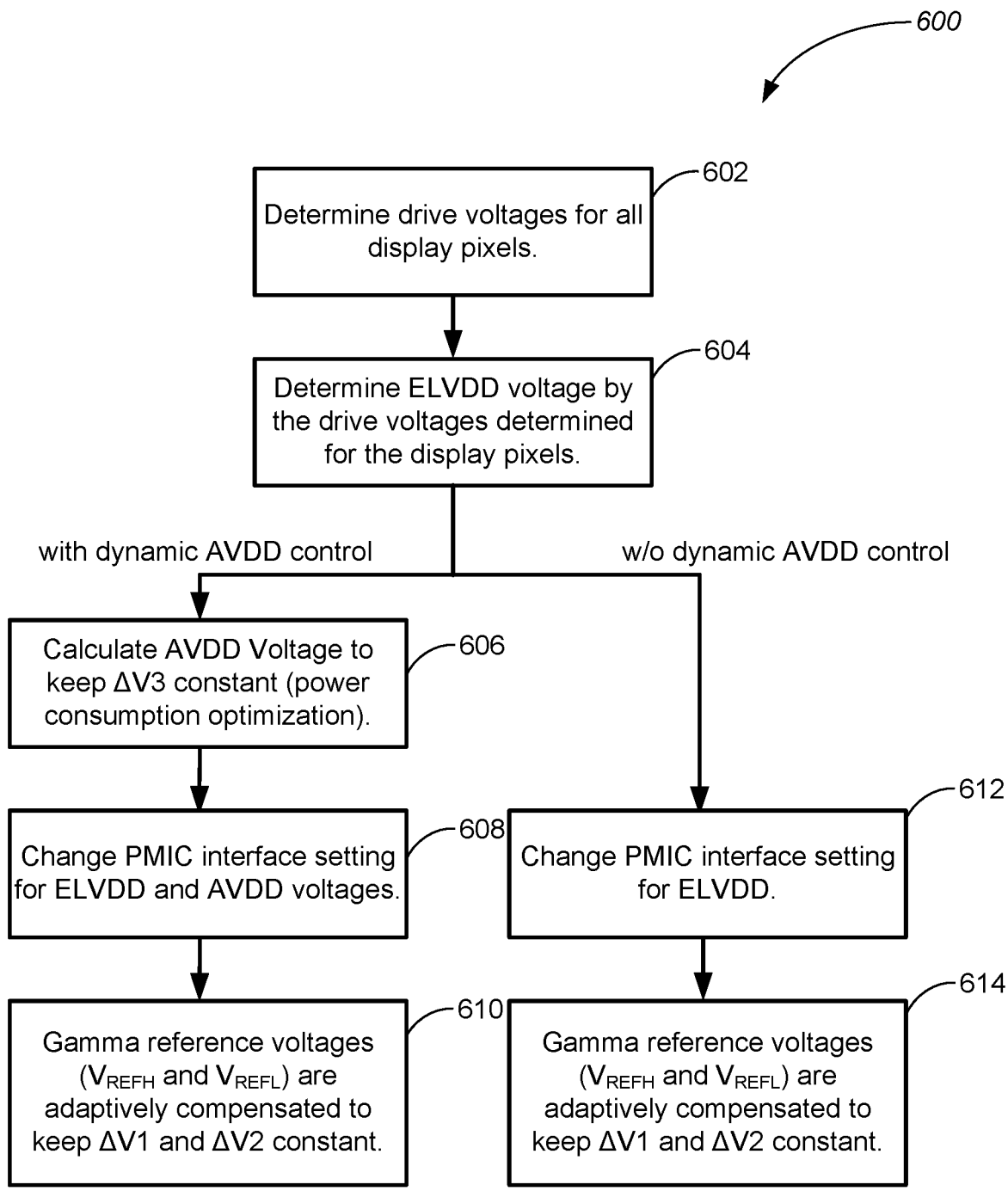
FIG. 6 is a flow diagram of another example method of controlling display power consumption for driving a display panel, in accordance with some embodiments.

FIG. 6 is a flow diagram of another example method 600 of controlling display power consumption for driving a display panel 225, in accordance with some embodiments. The method 600 is implemented by a display driving system 400 including a pixel drive circuit 202 and a PMIC 280 of an electronic system 200. The electronic system 200 includes a display panel 225 having a plurality of display pixels 350. The pixel drive circuit 202 or PMIC 280 is electrically coupled to a plurality of interconnects (e.g., control lines 308 and data lines 306) routed to access the plurality of display pixels 350. The display driving system 400 includes supply management logic 416 configured to dynamically adjust the display power supply ELVDD. Upon receiving video data of an image frame, the supply management logic 416 of the display driving system 400 determines (602) a plurality of drive voltages to be applied on the data lines 306 based on the image frame. Specifically, the supply management logic 416 determines a first display pixel 350 that has a maximum luminance level among the plurality of display pixels, and the first display pixel 350 has a maximum voltage drop across the gate and the source of a first drive transistor 304 in the first display pixel 350. After setting the drive voltage (i.e., the gate voltage) for the first display pixel 350, the supply management logic 416 determines (604) a voltage level of a display power supply ELVDD coupled to the source of the first drive transistor 304.

Referring to FIG. 4B, the pixel drive circuit 202 includes at least a gamma reference generator 412 and a source driver 410, and is optionally powered by a circuit power supply AVDD that is distinct from the display power supply ELVDD. In some embodiments, the circuit power supply AVDD is dynamically adjusted with the display power supply ELVDD. For example, the circuit power supply AVDD tracks the display power supply ELVDD while keeping a fixed offset voltage (e.g., $\Delta V3$) above the display power supply ELVDD. After determining the voltage level of the display power supply ELVDD, the supply management logic 416 determines (606) the circuit power supply AVDD based on the fixed offset voltage $\Delta V3$. In accordance with determinations of the voltage levels of the display power supply ELVDD and circuit power supply AVDD, the supply management logic 416 updates (608) PMIC interface settings for these two power supplies ELVDD and AVDD. In some embodiments, a gamma reference voltage $V_{GAMMA}$ is defined in a range between two predefined gamma rail voltages $V_{REFH}$ and $V_{REFL}$, and each of the two predefined gamma rail voltages $V_{REFH}$ and $V_{REFL}$ is linearly correlated with the display power supply ELVDD. In an example, the low gamma rail voltage $V_{REFL}$ is adaptively compensated (610) by the adaptive ELVDD compensation reference generator 418 to keep a first offset voltage $\Delta V1$ below the display power supply ELVDD. The high gamma rail voltage $V_{REFH}$ is greater than the low gamma rail voltage $V_{REFL}$, and adaptively compensated (610) by the adaptive ELVDD compensation reference generator 418 to keep a second offset voltage $\Delta V2$ above the display power supply ELVDD.

Alternatively, in some embodiments, the circuit power supply AVDD is fixed, independently of the dynamically adjusted display power supply ELVDD. In accordance with determinations of the voltage level of the display power supply EVLDD, the supply management logic 416 updates (612) display PMIC interface settings for the display power supply EVLDD, while keeping circuit PMIC interface settings for the circuit power supply AVDD. In some embodiments, the gamma reference voltage $V_{GAMMA}$ is defined in the range between the two predefined gamma rail voltages $V_{REFH}$ and $V_{REFL}$ that are linearly correlated with the display power supply ELVDD. The low gamma rail voltage $V_{REFL}$ is adaptively compensated (614) by the adaptive ELVDD compensation reference generator 418 to keep a first offset voltage ΔV1 below the display power supply ELVDD, while the high gamma rail voltage $V_{REFH}$ is adaptively compensated (614) to keep a second offset voltage ΔV2 above the display power supply ELVDD.

Figure 7:
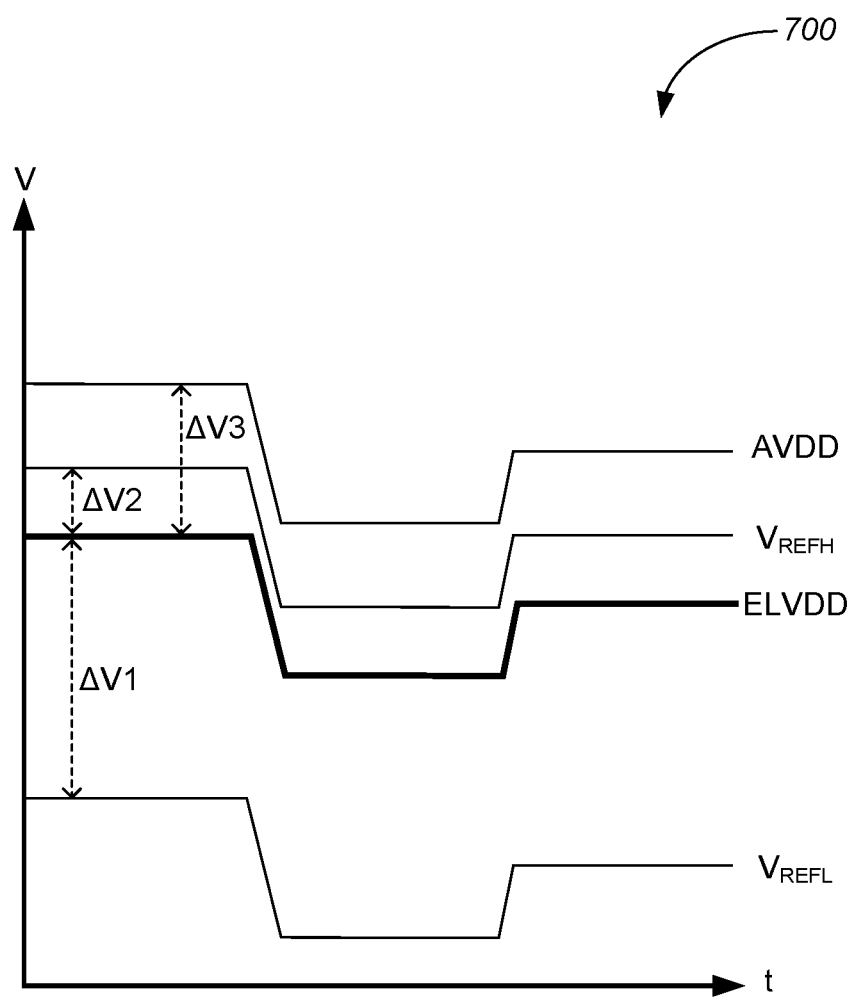
FIG. 7 is a diagram illustrating voltage levels of a display power supply, a circuit power supply and two gamma rail voltages associated with operations of a display panel, in accordance with some embodiments.

FIG. 7 is a diagram illustrating voltage levels 700 of a display power supply ELVDD, a circuit power supply AVDD and two gamma rail voltages associated with operations of a display panel 225, in accordance with some embodiments. The display panel 225 includes an array of display pixels 350 that are driven by a plurality of source drivers 410. Specifically, an image frame is displayed on the display panel 225 by activating display pixel rows in the display pixels sequentially while driving the display pixels 350 in each display row using the plurality of source drivers 410 in parallel. Each individual source driver 410 includes a DAC 420 configured to convert a multibit data item in the video data to a respective drive voltage for a corresponding display pixel 350. For each source driver 410, a gamma reference generator 412 is configured to generate a gamma reference voltage $V_{GAMMA}$. The DAC 420 applies the gamma reference voltage $V_{GAMMA}$ as a reference voltage setting a maximum voltage value for the drive voltage $V_{DR}$ that can be outputted by the source driver.

The gamma reference generator 412 and the plurality of source drivers 410 are driven by the circuit power supply AVDD. In some embodiments, when a voltage level of the display power supply ELVDD is dynamically adjusted, the circuit power supply AVDD is dynamically adjusted to keep a fixed offset voltage ΔV3 above the display power supply ELVDD. The fixed offset voltage ΔV3 is defined according to a circuit head room for optimizing power consumption of the electronic system 200. Specifically, in some situations, the fixed offset voltage ΔV3 is defined according to a threshold voltage or a saturation voltage drop of a transistor device to ensure that the gamma reference generator 412, source drivers 410 and display pixels 350 operate properly with the power supplies ELVDD and AVDD.

In some embodiments, the gamma reference voltage $V_{GAMMA}$ is defined in a range between two predefined gamma rail voltages $V_{REFH}$ and $V_{REFL}$ according to a gamma multibit signal (e.g., a 8-bit digital signal providing an 8-bit resolution for the gamma reference voltage $V_{GAMMA}$). When a voltage level of the display power supply ELVDD is dynamically adjusted, the low gamma rail voltage $V_{REFL}$ is adaptively compensated to keep a first offset voltage ΔV1 below the display power supply ELVDD, while the high gamma rail voltage $V_{REFH}$ is adaptively compensated to keep a second offset voltage ΔV2 above the display power supply ELVDD. The gamma rail voltages $V_{REFH}$ and $V_{REFL}$ are dynamically adjusted with the display power supply ELVDD independently of whether the circuit power supply AVDD is adjusted.

Figure 8:
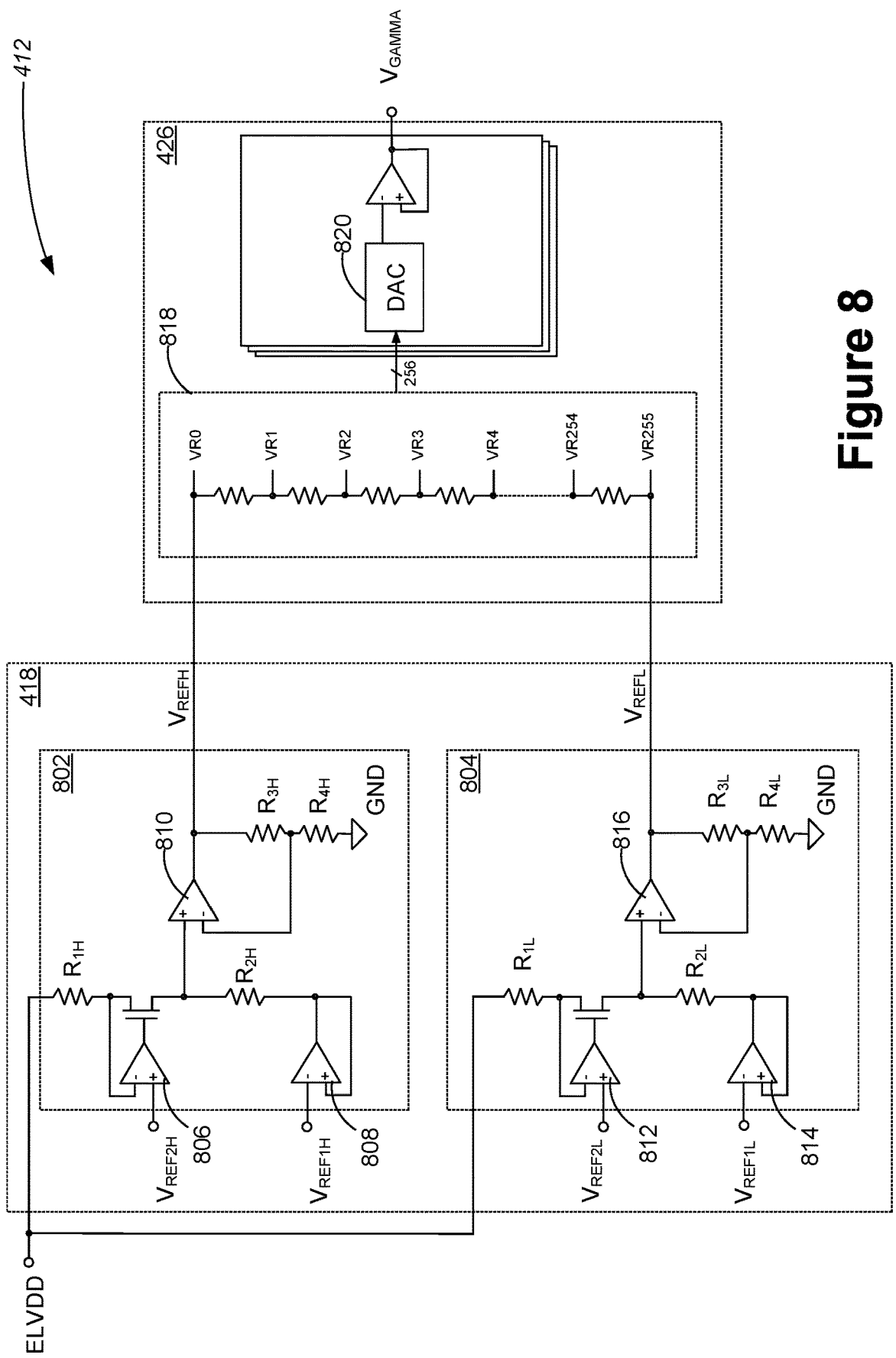
FIG. 8 is a block diagram of an example gamma reference generator, in accordance with some embodiments.

FIG. 8 is a block diagram of an example gamma reference generator 412, in accordance with some embodiments. The gamma reference generator 412 is driven between a display power supply ELVDD and a ground supply GND. The gamma reference generator 412 includes an adaptive supply compensation reference generator 418 that further includes a high gamma rail generator 802 and a low gamma rail generator 804. The high and low gamma rail generators 802 and 804 generate the high gamma rail voltage $V_{REFH}$ and the low gamma rail voltage $V_{REFL}$, respectively. A gamma voltage generator 426 is coupled to the high and low gamma rail generators 802 and 804, and generates a gamma reference voltage $V_{GAMMA}$ based on the first and second gamma rail voltages $V_{REFH}$ and $V_{REFL}$.

The high gamma rail generator 802 includes three operational amplifiers 806, 808, and 810 that are electrically coupled to each other via four resistors $R_{1H}$, $R_{2H}$, $R_{3H}$, and $R_{4H}$. The high gamma rail generator 802 receives two first reference voltages $V_{REF2H}$ and $V_{REF1H}$ that are generated by distinct voltage reference circuit and are substantially stable with respect to different power supplies and/or different loads of the distinct voltage reference circuit. For example, each of the reference voltages $V_{REF2H}$ and $V_{REF1H}$ varies less than 1% when a power supply or a load of the distinct voltage reference circuit fluctuates. Likewise, each of the reference voltages $V_{REF2H}$ and $V_{REF1H}$ is substantially stable (e.g., varies less than a threshold variation) when the power supply ELVDD or AVDD varies. In an example, the high gamma rail generator 802 generates the high gamma rail voltage $V_{REFH}$ from the reference voltages $V_{REF2H}$ and $V_{REF1H}$ as follows:

$$V_{REFH} = \left[(ELVDD - V_{REF2H})\frac{R_{2H}}{R_{1H}} + V_{REF1H}\right]\frac{R_{3H}+R_{4H}}{R_{4H}}. \quad (4)$$

In some embodiments, the resistors $R_{1H}$, $R_{2H}$, $R_{3H}$, and $R_{4H}$ are selected according to a resistor coefficient M. The two resistor ratios $$\frac{R_{1H}}{R_{2H}} \text{ and } \frac{R_{3H}+R_{4H}}{R_{4H}}$$

are set to a first resistor coefficient M. The high gamma rail voltage $V_{REFH}$ is represented as:

$$V_{REFH} = ELVDD - V_{REF2H} + V_{REF1H}M \quad (5)$$

The low gamma rail generator 804 includes three operational amplifiers 812, 814, and 816 that are electrically coupled to each other via four resistors $R_{1L}$, $R_{2L}$, $R_{3L}$, and $R_{4L}$. The low gamma rail generator 804 receives two first reference voltages $V_{REF2L}$ and $V_{REF1L}$ that are generated by the distinct voltage reference circuit and substantially stable with respect to different power supplies and/or different loads of the distinct voltage reference circuit. In some embodiments, the low gamma rail generator 804 generates the low gamma rail voltage $V_{REFL}$ from the reference voltages $V_{REF2L}$ and $V_{REF1L}$ as follows:

$$V_{REFL} = \left[(ELVDD - V_{REF2L})\frac{R_{2L}}{R_{1L}} + V_{REF1L}\right]\frac{R_{3L}+R_{4L}}{R_{4L}}. \quad (6)$$

In some embodiments, the resistors $R_{1L}$, $R_{2L}$, $R_{3L}$, and $R_{4L}$ are selected according to a second resistor coefficient N. The two resistor ratios $$\frac{R_{1L}}{R_{2L}} \text{ and } \frac{R_{3L}+R_{4L}}{R_{4L}}$$

are set to the second resistor coefficient N. The low gamma rail voltage $V_{REFL}$ is represented as:

$$V_{REFL} = ELVDD - V_{REF2L} + V_{REF1L}N \quad (7)$$

In accordance with equations (6) and (7), both the high and low gamma rail voltages $V_{REFH}$ and $V_{REFL}$ are linearly correlated with the display power supply ELVDD.

The gamma voltage generator 426 includes a string of serial resistors 818 coupled between the high and low gamma rail voltages $V_{REFH}$ and $V_{REFL}$. The gamma voltage generator 426 includes a predefined number of DACs 820 to provide the predefined number of gamma reference voltages $V_{GAMMA}$ for the source drivers 410. Each DAC 820 selects a node between two connected serial resistors 818 according to a respective gamma multibit signal, and outputs the gamma reference voltage $V_{GAMMA}$ for a corresponding source driver 410. In an example, the display driving system 400 has 240 source driver channels. The gamma voltage generator 426 receives 240 gamma multibit signals and outputs 240 gamma reference voltages $V_{GAMMA}$ for the 240 source driver channels. Each of the gamma multibit signal optionally has K bits (e.g., 8 bits). The string of serial resistors 818 may include $2^K-1$ resistors that have equal resistances and are biased in series between the high and low gamma rail voltages $V_{REFH}$ and $V_{REFL}$.

Alternatively, in an example, the plurality of display pixels includes a first subset of display pixels, a second subset of display pixels, and a third subset of display pixels. The first, second, and third subsets correspond to three distinct colors (e.g., red, green, and blue). For display pixels in each of the first, second, and third subsets, the gate voltages driving the gates of the corresponding drive transistors are generated with reference to a respective one of three distinct gamma reference voltages. The display driving system 400 has three source driver channels (i.e., three DACs 820). The gamma voltage generator 426 receives 3 gamma multibit signals and outputs 3 gamma reference voltages $V_{GAMMA}$ to be provided to three subsets of source drivers 410 associated with the three distinct colors.

It will also be understood that, although the terms "first" and "second" are used herein to describe various elements, these elements should not be limited by these terms. These terms are only used to distinguish one element from another. For example, a first display pixel can be termed a second display pixel, and, similarly, a second display pixel can be termed a first display pixel, without departing from the scope of the various described embodiments. The first display pixel and the second display pixel are both display pixels, but they optionally refer to the same display pixel or two distinct and different display pixels.

The terminology used in the description of the various described embodiments herein is for the purpose of describing particular embodiments only and is not intended to be limiting. As used in the description of the various described embodiments and the appended claims, the singular forms "a," "an," and "the" include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for controlling display power consumption, comprising:
   driving a display panel including a plurality of display pixels between a display power supply and a ground supply;
   receiving video data corresponding to an image frame to be displayed on the display panel, wherein the video data includes a plurality of multibit data items, and each display pixel is associated with a respective multibit data item defining a magnitude of a drive current of the respective display pixel;
   dynamically adjusting the display power supply according to the video data of the image frame, including:
      identifying a first multibit data item in the video data corresponding to a first display pixel to be driven to provide a corner luminance level of the image frame among the plurality of display pixels;
      determining a corner drive voltage of a plurality of drive voltages based on the first multibit data item, wherein the plurality of drive voltages corresponds to the plurality of display pixels and is configured to enable the drive current of each display pixel in the display panel; and
      adjusting a voltage level of the display power supply according to the corner drive voltage;
   in accordance with adjustment of the voltage level of the display power supply, adaptively compensating two gamma rail voltages to keep a respective difference between the display power supply and each gamma rail voltage unchanged; and
   for each display pixel, generating a respective drive voltage based on a respective gamma reference voltage, wherein the respective gamma reference voltage is defined in a range between the two gamma rail voltages.

2. The method of claim 1, further comprising:
   for each display pixel, applying the respective drive voltage on a respective drive transistor to generate the drive current to drive the respective display pixel.

3. The method of claim 1, wherein for each display pixel, the respective drive transistor includes a P-type metal-oxide-semiconductor field-effect transistor (MOSFET) that is physically disposed within the respective display pixel and electrically coupled to at least a row interconnect and a column interconnect.

4. The method of claim 1, further comprising:
generating the respective drive voltage with reference to the respective gamma reference voltage; and
applying the respective drive voltage as a gate voltage for driving a gate of the respective drive transistor.

5. The method of claim 4, wherein applying the respective one of the plurality of drive voltages further comprises:
electrically coupling a source of the respective drive transistor to the display power supply, wherein a voltage drop between the gate voltage and the display power supply determines the respective drive current generated by the respective drive transistor.

6. The method of claim 1, wherein the respective gamma reference voltage is defined in the range between the two gamma rail voltages according to a gamma multibit signal.

7. The method of claim 4, wherein the respective gamma reference voltage is greater than the display power supply, and the drive current outputted by the respective drive transistor is below a threshold drive current when the gate voltage is equal to the respective gamma reference voltage.

8. The method of claim 4, wherein:
the plurality of display pixels includes a first subset of display pixels, a second subset of display pixels, and a third subset of display pixels;
the first, second, and third subsets correspond to three distinct colors; and
for display pixels in each of the first, second, and third subsets, the gate voltages driving the gates of the corresponding drive transistors are generated with reference to a respective one of three distinct gamma reference voltages.

9. The method of claim 4, wherein for each display pixel, the gate voltage is generated within a range of the ground supply and the respective gamma reference voltage based on the multibit data item corresponding to the respective display pixel.

10. The method of claim 1, wherein the corner drive voltage is applied to drive the first display pixel, and adjusting the voltage level of the display power supply based on the corner drive voltage further comprises:
setting a corner gate voltage of a first drive transistor coupled in the first display pixel according to the corner drive voltage; and
determining the voltage level of the display power supply according to the corner gate voltage of the first drive transistor, such that the first display pixel is driven to provide the corner luminance level when the corner gate voltage and the display power supply are applied on the first drive transistor.

11. The method of claim 10, wherein the corner gate voltage of the first drive transistor is associated with the corresponding first multibit data item.

12. The method of claim 10, wherein the corner drive voltage is greater than a voltage level of the ground supply.

13. The method of claim 1, wherein the display panel includes an array of active-matrix organic light-emitting diode (AMOLEDs), and each display pixel includes an organic light-emitting diode (LED) configured to be driven by the respective drive current to provide a luminance level determined by the respective multibit data item of the respective display pixel.

14. The method of claim 1, wherein the plurality of display pixels is coupled to a pixel drive circuit that is disposed adjacent to the plurality of display pixels and electrically coupled to a plurality of interconnects routed to access the plurality of display pixels.

15. The method of claim 14, further comprising:
independently of dynamically adjusting the display power supply, driving the pixel drive circuit with a circuit power supply that is fixed.

16. The method of claim 14, further comprising
driving the pixel drive circuit with a circuit power supply; and
dynamically adjusting the circuit power supply with reference to the display power supply.

17. A display device, comprising:
a display panel having a plurality of display pixels;
a pixel drive circuit coupled to the display panel and including a plurality of DACs;
one or more processors; and
memory having instructions stored thereon, which when executed by the one or more processors cause the processors to perform:
driving a display panel including a plurality of display pixels between a display power supply and a ground supply;
receiving video data corresponding to an image frame to be displayed on the display panel, wherein the video data includes a plurality of multibit data items, and each display pixel is associated with a respective multibit data item defining a magnitude of a drive current of the respective display pixel;
dynamically adjusting the display power supply according to the video data of the image frame, including:
identifying a first multibit data item in the video data corresponding to a first display pixel of the image frame to be driven to provide a corner luminance level among the plurality of display pixels;
determining a corner drive voltage of a plurality of drive voltages based on the first multibit data item, wherein the plurality of drive voltages corresponds to the plurality of display pixels and is configured to enable the drive current of each display pixel in the display panel; and
adjusting a voltage level of the display power supply according to the corner drive voltage;
in accordance with adjustment of the voltage level of the display power supply, adaptively compensating two gamma rail voltages to keep a respective difference between the display power supply and each gamma rail voltage unchanged; and
for each display pixel, generating a respective drive voltage based on a respective gamma reference voltage, wherein the respective gamma reference voltage is defined in a range between the two gamma rail voltages.

18. The display device of claim 17, wherein the instructions stored in the memory further cause the processors to:
for each display pixel, apply the respective drive voltage on a respective drive transistor to generate the drive current to drive the respective display pixel, wherein for each display pixel, the respective drive transistor includes a P-type metal-oxide-semiconductor field-effect transistor (MOSFET) that is physically disposed within the respective display pixel and electrically coupled to at least a row interconnect and a column interconnect.

19. A non-transitory computer-readable medium, having instructions stored thereon, which when executed by one or more processors of a display device cause the processors to perform:

driving a display panel of the display device, including a plurality of display pixels between a display power supply and a ground supply;

receiving video data corresponding to an image frame to be displayed on the display panel, wherein the video data includes a plurality of multibit data items, and each display pixel is associated with a respective multibit data item defining a magnitude of a drive current of the respective display pixel;

dynamically adjusting the display power supply according to the video data of the image frame, including:

identifying a first multibit data item in the video data corresponding to a first display pixel of the image frame to be driven to provide a corner luminance level among the plurality of display pixels;

determining a corner drive voltage of a plurality of drive voltages based on the first multibit data item, wherein the plurality of drive voltages corresponds to the plurality of display pixels and is configured to enable the drive current of each display pixel in the display panel; and adjusting a voltage level of the display power supply according to the corner drive voltage;

in accordance with adjustment of the voltage level of the display power supply, adaptively compensating two gamma rail voltages to keep a respective difference between the display power supply and each gamma rail voltage unchanged; and for each display pixel, generating a respective drive voltage based on a respective gamma reference voltage, wherein the respective gamma reference voltage is defined in a range between the two gamma rail voltages.

20. The non-transitory computer-readable medium of claim 19, wherein the instructions further cause the processors to:

for each display pixel, apply the respective drive voltage on a respective drive transistor to generate the drive current to drive the respective display pixel, wherein for each display pixel, the respective drive transistor includes a P-type metal-oxide-semiconductor field-effect transistor (MOSFET) that is physically disposed within the respective display pixel and electrically coupled to at least a row interconnect and a column interconnect.

\* \* \* \* \*